Jan. 21, 1964 H. P. BRAEN ET AL 3,119,102

SUPPORTING MEANS FOR TRANSDUCER ASSEMBLIES

Filed Sept. 6, 1960

INVENTORS
HENRY P. BRAEN
HURDIE H. BURK, JR.
BY Paul D. Carmichael
ATTORNEY

United States Patent Office 3,119,102

Patented Jan. 21, 1964

3,119,102

SUPPORTING MEANS FOR TRANSDUCER ASSEMBLIES

Henry P. Braen, Nichols, and Hurdie H. Burk, Jr., Vestal, N.Y., assignors to International Business Machines Corporation, New York, N.Y., a corporation of New York Filed Sept. 6, 1960, Ser. No. 54,006
5 Claims. (Cl. 340—174.1)

The present invention relates generally to the art of recording and reproducing information and in particular to an improved arrangement for supporting transducer assemblies of the floated shoe type.

In the electronic data processing art, much use is made of magnetizable record media for receiving information and storing it until the information is required for use. One such magnetizable medium is a magnetic drum which may be employed as a storage means in a computer. A transducer assembly serving as a write head, which is adapted to receive information to be stored and to produce a magnetized pattern on a portion of the drum, and a transducer assembly serving as a read head, which is adapted to read the information stored on the drum, are disposed in longitudinally aligned and spaced relation with respect to the recording track. An arrangement wherein the information on the drum is sensed by the read head, amplified and supplied to the write head where it is again written on the drum substantially reduces the time required to obtain the information stored on the drum and has been referred to in the art as a "revolver."

In the past, it has been proposed to support a transducer assembly on a shoe having a bottom surface of substantial area which in turn rides on the laminar boundary of fluid about the periphery of the magnetic drum. The force, due to the pressure in the wedge of fluid between the shoe and drum caused by the relative motion of the adjacent surfaces and the viscosity of the fluid, keeps the shoe and the transducer assembly away from the drum and is resisted by the force of suitable mechanical biasing means which tend to put the shoe in contact with the drum. This arrangement has been found particularly advantageous in that the shoe and the transducer assembly associated therewith are maintained in predetermined spaced relation with respect to the outer periphery of the drum regardless of the irregularities and defects in the surface of the drum. As a result, the fabrication and mounting of the drum are greatly simplified.

A limitation in prior art devices employing transducer assemblies of the floated shoe type is that it has been impossible to mount the read head and the write head in closely spaced longitudinal relation with respect to the record track of the moving record medium, as required in one word revolvers, for example, while yet employing and utilizing the basic principles of floating shoe design. It has been found that for maximum utilization of the floated shoe type of supporting means the means for pivoting the transducer assembly to the shoe should be located at a point approximately two-thirds of the length of the shoe from the leading edge thereof along the periphery of the drum to obtain a balance of moments. Also, the loading or biasing of the floating shoe should take place solely through the pivot means mounting the transducer assembly from the shoe. Due to the relatively large surface area required to support the floating shoes and the transducer assemblies on the laminar boundary of fluid about the drum it has heretofore been impossible to mount the transducer assemblies in closely adjacent relation while yet satisfying the above-mentioned mechanical design requirements.

Briefly, the present invention relates to means for supporting transducer assemblies which comprises a pair of floating shoes that are pivoted to and disposed in laterally spaced relation on opposite sides of one transducer assembly and another shoe supporting a second transducer assembly which is nestingly received between the first mentioned laterally spaced pair of shoes. This allows close spacing of the gaps of the transducer assemblies along a track of a record medium. The invention also relates to a supporting means for a transducer assembly comprising a pair of pivoted shoes mounted in transverse offset relation with respect to the transducer assembly whereby the same is supported adjacent a record medium in an improved manner.

It is the primary or ultimate object of this invention to provide supporting means for transducer assemblies wherein the transducer assemblies are disposed in close longitudinally spaced relation along the record medium and wherein the floating shoes mount the transducer assemblies in the required manner.

Another object of the invention is to provide improved supporting means for transducer assemblies wherein the floating shoes having bottom surfaces of substantial surface area are offset laterally with respect to the direction of movement of the record medium to allow close mounting of the transducer assemblies.

Yet another object of the invention is to provide an improved supporting means of the floated shoe type for a transducer assembly wherein the transducer assembly is supported by a pair of floating shoes disposed on opposite sides of the transducer assembly. In this manner a second transducer assembly carried by another floating shoe can be supported in closely adjacent relation with respect to the first transducer assembly with the other floating shoe nesting between the first mentioned transversely spaced floating shoes.

Still another object of this invention is to provide transducer supporting means of the floated shoe type wherein the transducer assembly is adapted to faithfully follow any irregularities of the record medium.

It is a further object of this invention to provide supporting means for transducer assemblies which is simply constructed of individual parts, which themselves are simple, thereby allowing the supporting means of this invention to be constructed in a minimum of time and with a minimum of effort.

The foregoing and other objects, features and advantages of the invention will be apparent from the following more particular description of a preferred embodiment of the invention, as illustrated in the accompanying drawings.

Figure 1:
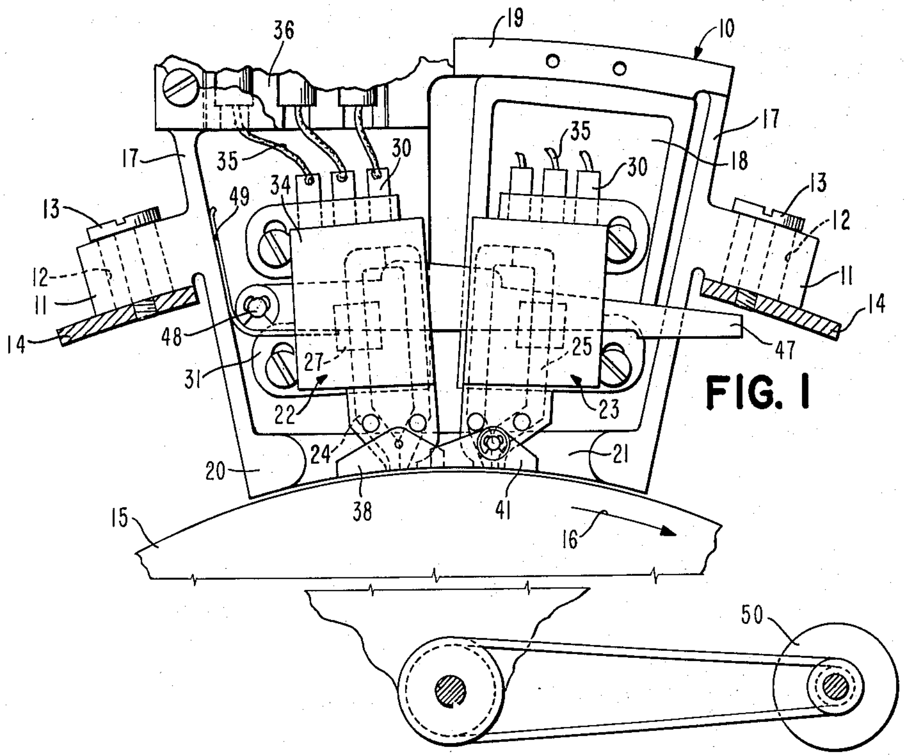
FIG. 1 is a side eletvational view, partially in section, of improved transducer supporting means constructed in accordance with the teachings of this invention.
Figure 2:
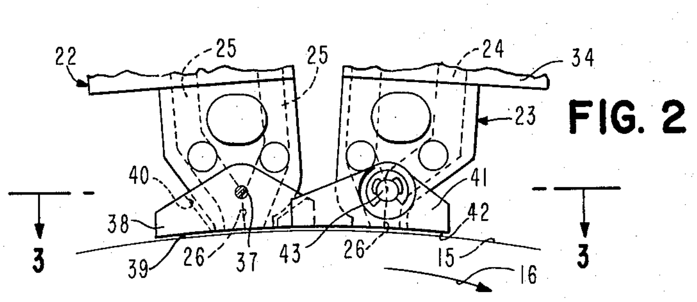
FIG. 2 is a fragmentary and enlarged side elevational view showing a portion of the apparatus of FIG. 1.
Figure 3:
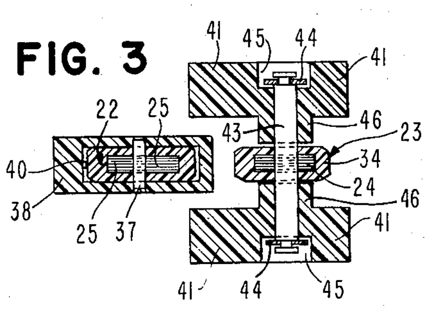
FIG. 3 is a plan sectional view taken along the section line 3—3 of FIG. 2.

For a more detailed description of the invention, reference should be made to the drawings. The reference numeral 10 designates a supporting housing formed with projecting arms 11 having apertures 12 therein. Screws 13 extend through the apertures 12 to mount the supporting housing 10 on a suitable support 14 adjacent the surface of a rotatable magnetic record medium 15. The record medium 15 may comprise a magnetic drum and is adapted to be rotated in a clockwise direction as indicated by arrow 16. The supporting housing 10 includes side walls 17, back wall 18, top wall 19 and bottom wall 20. The bottom wall 20 has an opening 21 therein through which the lower end portions of the transducer assemblies and the supporting means therefor extend.

Mounted in the supporting housing 10 in longitudinally spaced relation are a pair of transducer assemblies 22 and 23. Each of the transducer assemblies 22 and 23 comprises a magnetic core 24 having a pair of spaced core legs 25 which converge at their lower ends. A small separation is maintained between the core legs 25 at a point adjacent the record medium 15 to provide a gap 26. A coil of wire 27 is placed over one of the core legs 25. The coil 27 is operative to sense a change or effect a change in the magnetic flux density in the magnetic circuit depending on the use of the transducer assembly as a read head or a write head as is well known in the art.

Each of the transducer assemblies 22 and 23 is supported in offset relation with respect to the back wall 18 of the supporting housing 10 by means of three generally L-shaped terminal strips 30 which are preferably fabricated from a current conductive and resilient material, such as one of the copper alloys, for example. The upturned and vertically extending end portions of the terminal strips 30 are received in suitable insulating brackets 31 that are mounted on the back wall 18 of the supporting housing 10. The laterally projecting end portions of the three L-shaped terminal strips 30 are electrically connected to the coil 27. The core legs 25, the coil 27, and the laterally projecting end portions of the three terminal strips 30 for the transducer assembly are incased and embedded in a casing 34 of plastic or other similar protective and non-conducting material. The three terminal strips 30 provide electrical connection with the coil 27 and, due to the resilient material forming the same and the mounting thereof, exert a biasing force tending to move the transducer assembly toward the moving record medium 15.

Lead wires 35 are connected to the upper ends of the L-shaped terminal strips 30 which project above the brackets 31. These lead wires extend to and provide electrical connection with a pair of suitable terminal blocks 36. The terminal blocks 36 serve as convenient receptacle means for connecting the transducer assemblies with ancillary electronic apparatus, not shown.

Pivotally attached to the lower end of the transducer assembly 22 by a transverse pin 37 extending transversely through the casing 34 is a shoe 38. The shoe 38 has a relatively large lower surface 39 having approximately the same radius of curvature as that of the surface of the record medium 15. The shoe 38 has a tapered slot-like opening 40 therein through which extends the lower end portion of the transducer assembly 22. In this manner the gap 26 of the transducer assembly 22 is disposed in adjacent relation with respect to the lower surface 39 of the shoe 38. The shoe 38 is pivoted on the pin 37 whereby the same may have relative tipping movement with respect to the transducer assembly 22.

The supporting means for the transducer assembly 23 comprises a pair of shoes 41 which each have a lower surface 42 of a curvature corresponding generally to the curvature of the record medium 15. An elongated pin 43 extends transversely through the lower end of the casing 34 for the transducer assembly 23 and the shoes 41 are pivotally mounted adjacent each end of this pin. The lower end of the transducer assembly 23 extends downwardly between the spaced shoes 41 whereby the gap 26 of this transducer assembly is disposed in adjacent relation with respect to the plane of the lower surfaces 42 of these shoes.

A clip 44 is attached to each end of the pin 43 to retain the transducer assembly and the shoes 41 in assembled relation. The clips 44 are received in generally semi-circular recesses 45 provided in the outer side surfaces of the shoes 41. The shoes 41 are pivoted on the pin 43 whereby the same may have independent tipping movement with respect to the transducer assembly 23. Each of the shoes 41 has an inwardly extending annular enlargement 46 on one side thereof which serves as a spacer for positioning the lower surface of the shoe in predetermined offset relation with respect to the transducer assembly.

The transverse spacing between the shoes 41 is sufficient to permit the shoe 38 to be positioned in nesting relation therebetween. As shown in the various views of the drawings, the shoes 38 and 41 extend in side-by-side relation for a portion of their lengths. The shoes 38 and 41 may be formed of a non-magnetic material, such as plastic.

A lift lever 47 extends in back of the transducer assemblies 22 and 23 and one end portion of this lever is pivoted on pin 43 while the other end portion thereof normally rests on a shoulder provided in the side wall 17 of the supporting housing 10. The lift lever 47 is normally biased into this position by a leaf spring 49. When in the above-mentioned position, the lift lever does not engage the transducer assemblies. However, when a lifting force is applied to the projecting end portion of the lift lever, the same is raised and engages pins, not shown, projecting transversely from the transducer assemblies whereby the transducer assemblies 22 and 23 and the shoes 38 and 41 are moved vertically upward with respect to the surface of the record medium 15. Means may be provided for raising the lift lever during the times that the magnetic medium is starting and stopping.

Considering now the operation of the apparatus above described, it will be assumed that the magnetic record medium 15 is being rotated in a clockwise direction at a relatively high angular velocity by a motor 50 to create a laminar boundary of fluid which adheres to the surface of the record medium. The curved lower surfaces 39 and 42 of the shoes 38 and 41, respectively, are adapted to be supported away from the surface of the moving record medium by the above described laminar boundary of fluid. The terminal strips 30 resiliently bias the transducer assemblies and the shoes toward the surface of the recording medium in such a manner that the shoes and the transducer assemblies are moved vertically to compensate for any irregularities on the surface of the moving record medium. A substantially uniform spacing is thus maintained between the surface of the moving record medium and the gaps of the transducer assemblies. The transversely spaced shoes 41 are individually pivotally mounted from the transducer assembly 23 to allow independent tipping movement of the same with respect to the transducer assembly. Each shoe 41 is thus adapted to accurately follow the contours of the laminar boundary of fluid thereunder and to exert a correcting vertical moving force on the transducer assembly.

A brief description of the operation of revolving or recirculating information will aid in understanding the use of the present invention. The transducer assembly 23 is employed for reading information from the record medium while the transducer assembly 22 is used for writing information back on the record medium.

A magnetized pattern of information may be placed on the record medium 15 by supplying suitable electrical input information to the coil 27 associated with the transducer assembly 22. Once the information to be recirculated is placed on the record medium, the output signals sensed by the read transducer assembly 23 are connected to an amplifier whose output is supplied to a conventional write control circuit. The latter circuit determines the input to the write transducer assembly 22. A more complete description of this apparatus and the operation thereof is to be found in U.S. Patent No. 2,901,166, which is assigned to the assignee of the present invention. The arrangement is such that the information on the record medium which arrives under the read transducer assembly is immediately written back on the record medium by the write transducer assembly. The amount or length of the information which can be stored in this fashion is a function of the spacing between the magnetic gaps of the transducer assemblies. For a one word revolver or the like, it is necessary that the gaps of the read and write transducer assemblies be mounted in closely adjacent relation as, for example, with ¼-inch spacing between these gaps.

In accordance with the teachings of the present invention the shoes 41 supporting the read transducer assembly are positioned in laterally offset relation with respect to the shoe 38 supporting the write transducer assembly. The shoe 38 nests between the shoes 41 whereby the required closed adjacent positioning of the gaps of the transducer assemblies is provided, but yet the lower surfaces 39 and 42 of the shoes are sufficient area to properly support the transducer assemblies on the laminor boundary of fluid. The leading ends of the transversely spaced shoes 41 extend forwardly past the trailing end of the shoe 38. The various supporting shoes are offset laterally with respect to each other but the gaps of the transducer assemblies are closely spaced in longitudinal relation with respect to the record track on the record medium.

The disclosed supporting arrangement provides the necessary clearances which allow the pivot points defined by the pins 37 and 43 to be located approximately two-thirds of the shoe lengths from the leading edges thereof. Also, the loading of the shoes, due to the biasing forces exerted by the terminal strips 30, takes place solely through the pivot pins 37 and 43.

It should now be apparent that we have accomplished the objects initially set forth by providing improved supporting means for transducer assemblies. Of particular importance is the offset and nesting arrangement of the floating shoes which provides for close spacing of the gaps of the transducer assemblies while yet providing sufficient clearances to allow proper mounting of the shoes.

While the invention has been particularly shown and described with reference to a preferred embodiment thereof, it will be understood by those skilled in the art that various changes in form and details may be made therein without departing from the spirit and scope of the invention.

What is claimed is:

1. A revolver for recirculating information recorded on a moving record medium comprising a pair of transducer assemblies, said transducer assemblies being disposed adjacent the record medium in closely spaced relation therealong, first means supporting one of said transducer assemblies, second means supporting the other of said transducer assemblies, said first means supporting comprising a first shoe member, said first shoe member having an opening therein for the reception of a portion of the transducer assembly associated therewith, said second means supporting comprising second and third shoe members, said second and third shoe members being offset on opposite sides with respect to said first shoe member and said transducer assemblies in a direction transverse to the direction of movement of the record medium, the movement of the record medium creating a laminar boundary of fluid upon which said shoe members are adapted to ride, and said shoe members extending in side-by-side relation for at least a portion of their lengths.

2. Apparatus for recording and reproducing information on a record medium comprising a pair of transducer assemblies, said transducer assemblies being disposed adjacent the record medium in closely spaced relation therealong, first means supporting one of said transducer assemblies, second means supporting the other of said transducer assemblies, said first means supporting comprising a first shoe member, said first shoe member mounting said one of said transducer assemblies, said second means supporting comprising second and third shoe members, said second and third shoe members being offset on opposite sides of said other of said transducer assemblies and with respect to said one of said transducer assemblies and said first shoe member, and said shoe members extending in side-by-side relation for at least a portion of their lengths.

3. Apparatus for manifesting intelligence on a record medium comprising a transducer assembly, supporting means mounting said transducer assembly, said supporting means comprising a pair of shoe members, means to effect relative movement between the record medium and said transducer assembly to provide a laminar boundary of fluid adjacent the record medium upon which said shoe members are adapted to ride, and said shoe members being pivotally mounted for independent pivotal movement on opposite sides of said transducer assembly in transversely spaced relation with respect to the direction of relative movement between said transducer assembly and the recording medium.

4. Apparatus according to claim 3 characterized in that said supporting means comprises a transversely extending pin member spanning said shoe members and mounting said transducer assembly, and said shoe members being pivotally mounted adjacent the ends of said pin member for independent pivotal movement.

5. Apparatus according to claim 4 characterized in that each of said shoe members comprises a transversely projecting enlargement adjacent said transducer assembly, said pin member extending through the enlargements, and said enlargements serving as spacers to position said shoe members in transversely spaced relation on opposite sides of said transducer assembly.

References Cited in the file of this patent

UNITED STATES PATENTS

| | | |
|---|---|---|
| 2,862,781 | Baumeister | Dec. 2, 1958 |
| 2,863,004 | Maclay et al. | Dec. 2, 1958 |
| 2,540,654 | Cohen et al. | Feb. 6, 1961 |